United States Patent
Xu et al.

(10) Patent No.: US 10,346,304 B2
(45) Date of Patent: Jul. 9, 2019

(54) CACHE MANAGEMENT FOR MULTI-NODE DATABASES

(71) Applicant: Microsoft Technology Licensing, LLC, Redmond, WA (US)

(72) Inventors: Liqin Xu, Fremont, CA (US); Wen Pu, Santa Clara, CA (US); Rohan Ramanath, Saratoga, CA (US); Kun Liu, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 52 days.

(21) Appl. No.: 15/659,544

(22) Filed: Jul. 25, 2017

(65) Prior Publication Data

US 2019/0034338 A1    Jan. 31, 2019

(51) Int. Cl.
*G06F 12/0815* (2016.01)
*G06F 11/07* (2006.01)
(Continued)

(52) U.S. Cl.
CPC ........ *G06F 12/0815* (2013.01); *G06F 11/073* (2013.01); *G06F 16/2358* (2019.01);
(Continued)

(58) Field of Classification Search
CPC ............... G06F 12/082; G06F 12/0822; G06F 12/0815; G06F 11/073; G06F 16/2358;
(Continued)

(56) References Cited

U.S. PATENT DOCUMENTS 5,305,389 A * 4/1994 Palmer ............... G06F 12/0862
                                                              382/100
7,788,449 B2 * 8/2010 Karn .................. G06F 12/0802
                                                              707/E17.12
(Continued)

FOREIGN PATENT DOCUMENTS

WO    WO-2010036525 A2 *  4/2010    ............. G06Q 30/02

OTHER PUBLICATIONS

Mowry et al. "Predicting Data Cache Misses in Non-Numeric Applications Through Correlation Profiling", Aug. 6, 2002, IEEE (Year: 2002).*

*Primary Examiner* — Yaima Rigol
(74) *Attorney, Agent, or Firm* — Hickman Palermo Becker Bingham LLP

(57) ABSTRACT

Techniques related to cache management for multi-node databases are disclosed. In some embodiments, a system comprises one or more computing devices including a training component, data store, cache, filtering component, and listening component. The training component produces a plurality of models based on user interaction data. The plurality of models are stored in the data store, which responds to requests from the cache when the cache experiences cache misses. The cache stores a first subset of the plurality of models. The filtering component selects a second subset of the plurality of models based on one or more criteria. Furthermore, the filtering component sends the second subset of the plurality of models to a messaging service. The listening component retrieves the second subset of the plurality of models from the messaging service. Furthermore, the listening component causes the second subset of the plurality of models to be stored in the cache.

18 Claims, 5 Drawing Sheets

(51) Int. Cl.
*G06F 16/27* (2019.01)
*G06F 16/23* (2019.01)
*G06F 16/2455* (2019.01)

(52) U.S. Cl.
CPC ...... *G06F 16/24552* (2019.01); *G06F 16/273* (2019.01); *G06F 2201/80* (2013.01)

(58) Field of Classification Search
CPC ............. G06F 16/24552; G06F 16/273; G06F 2201/80
See application file for complete search history.

(56) References Cited

U.S. PATENT DOCUMENTS

| | | | |
|---|---|---|---|
| 10,037,276 B1* | 7/2018 | Dalal | G06F 12/0806 |
| 2003/0046311 A1* | 3/2003 | Baidya | G06F 16/954 |
| 2004/0230952 A1* | 11/2004 | Massaro | G06F 17/2211 |
| | | | 717/120 |
| 2013/0346704 A1* | 12/2013 | Burger | G06F 16/9574 |
| | | | 711/137 |
| 2014/0059163 A1* | 2/2014 | Herbrich | G06F 17/30348 |
| | | | 709/217 |
| 2014/0181585 A1* | 6/2014 | Hoang | G06F 11/3034 |
| | | | 714/26 |
| 2014/0195788 A1* | 7/2014 | Kalogeropulos | G06F 8/4442 |
| | | | 712/237 |
| 2015/0199276 A1* | 7/2015 | Radhakrishnan | G06F 12/0862 |
| | | | 711/137 |
| 2015/0278100 A1* | 10/2015 | Sundaram | G06F 12/0862 |
| | | | 711/137 |
| 2017/0193028 A1* | 7/2017 | Iyengar | G06F 17/30368 |
| 2017/0371790 A1* | 12/2017 | Dwiel | G06F 12/0811 |
| 2018/0183891 A1* | 6/2018 | Zhang | H04L 67/2847 |

* cited by examiner

FIG. 2

FILTERING COMPONENT 116

OLD VERSION 200: 0.2 | 0.1 | 1.4 | 0.8 | 0.5 | 0.3 | 1.6 | 0.9 | 0.7

NEW VERSION 202: 0.8 | 0.5 | 1.2 | 0.4 | 0.9 | 0.3 | 1.7 | 0.1 | 0.6

CACHE MANAGEMENT FOR MULTI-NODE DATABASES

TECHNICAL FIELD

Embodiments relate to information storage and retrieval technologies and, more specifically, to cache management for multi-node databases.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A multi-node database offers many advantages over a single-node database. For example, a multi-node database may offer low-latency access to large amounts of data and high availability even in the event of a node failure.

However, a multi-node database also has a number of disadvantages relative to a single-node database. For example, since a multi-node database exhibits an increased amount of network traffic, data writes may be performed in batches. As a result, updating a multi-node database can take hours, especially if thousands of nodes are involved. This has an adverse effect on data integrity, because an old version of data may continue to be served hours after a new version has come into existence.

These disadvantages are compounded when caching is used in the context of a multi-node database. In particular, caching may prolong the use of inaccurate versions of data, because a cache entry may not be updated until it expires.

BRIEF DESCRIPTION OF THE DRAWINGS

In the drawings:

FIG. 2 depicts an approach for selecting models to be pre-loaded into a cache.

Figure 1:
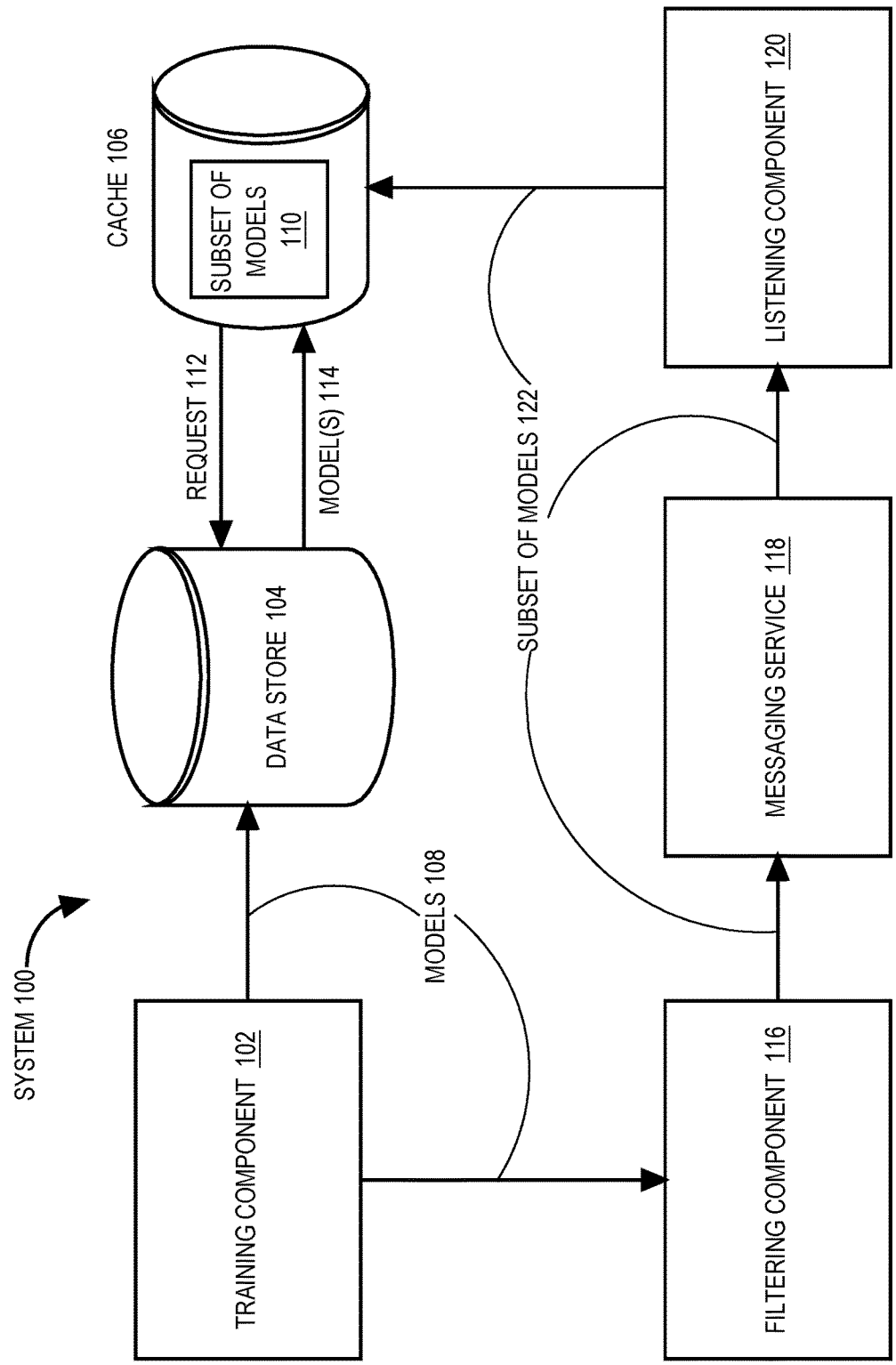
FIG. 1 depicts an example computer architecture upon which embodiments may be implemented.

While each of the drawing figures depicts a particular embodiment for purposes of depicting a clear example, other embodiments may omit, add to, reorder, and/or modify any of the elements shown in the drawing figures. For purposes of depicting clear examples, one or more figures may be described with reference to one or more other figures, but using the particular arrangement depicted in the one or more other figures is not required in other embodiments.

DETAILED DESCRIPTION

In the following description, for the purposes of explanation, numerous specific details are set forth in order to provide a thorough understanding of the present disclosure. It will be apparent, however, that the present disclosure may be practiced without these specific details. In other instances, well-known structures and devices are shown in block diagram form in order to avoid unnecessarily obscuring the present disclosure. Modifiers such as "first" and "second" may be used to differentiate elements, but the modifiers do not necessarily indicate any particular order.

Introduction

Shortly after an updated version of data is generated, the updated version may be stored in a cache based on predictive caching. Predictive caching involves determining which data is most likely to be requested and pre-loading the data into the cache in advance of any requests for the data. Among the data selected for predictive caching is new data or data that is currently absent from the data store corresponding to the cache. The new data includes original versions as well as updated versions of data. Pre-loading original versions of data into the cache has the benefit of reducing cache miss rates, and pre-loading updated versions of data into the cache has the benefit of increasing the accuracy of data to be served.

In some embodiments, a subset of the updated versions may be selected based on whether they correspond to older versions that were requested recently. For example, if an older version of particular data has been requested within the past twenty-four hours, then an updated version of the particular data may be pre-loaded into the cache.

Data selected for predictive caching may be published via a distributed messaging service. Thereafter, a subscriber may retrieve the selected data and cause the selected data to be pre-loaded into the cache.

In some embodiments, predictive caching may be used in conjunction with traditional or reactive caching. Reactive caching may be used to respond to any cache misses by causing requested data to be loaded into the cache in preparation for any subsequent requests for the requested data.

System Overview

Referring to FIG. 1, system 100 comprises one or more computing devices that use reactive caching in conjunction with predictive caching. In some embodiments, a reactive caching subsystem may comprise training component 102, data store 104, and cache 106. In some embodiments, a predictive caching subsystem may comprise training component 102, filtering component 116, messaging service 118, listening component 120, and cache 106. Although system 100 is depicted in the example context of big data analytics, it should be appreciated that system 100 may be implemented in any of a variety of contexts involving large data sets.

More specifically, system 100 is related to generating and storing predictive models for predicting user behavior. Thus, training component 102 may be one or more computing devices and/or software executed by the one or more computing devices that produce models 108 based on receiving, as input, user interaction data. For example, training component 102 may be implemented on one or more clusters of computers using the APACHE HADOOP framework for distributed storage and processing of big data sets.

Models 108 may be implemented as arrays, vectors, or the like which store data that can be used to predict user interaction with content items. For example, each of models 108 may be a vector that stores a set of coefficients that are used to predict a click-through rate for a content item, such as an advertisement. Each coefficient may indicate a degree of correlation between the advertisement and a particular user-specific attributes, such as geolocation, occupation, hobby, context attributes (such as computing platform, time, etc.), or the like.

Models 108 are transmitted to data store 104 for storage. Data store 104 is a repository for persistently storing models 108. For example, data store 104 may be a distributed key-value store (an example of which is Voldemort), which receives models 108 from training component 102 via Voldemort build and push jobs.

Data store 104 responds to requests from cache 106 when cache 106 experiences cache misses. In some embodiments, cache 106 resides on a separate set of one or more computing devices from data store 104. For example, cache 106 may comprise a first set of one or more computing devices, and data store 104 may comprise a second set of one or more computing devices. In some embodiments, cache 106 resides on the same one or more computing devices as data store 104. For example, cache 106 may reside in volatile memory of a distributed data store. When system 100 receives a request for one or more models that are stored in cache 106, the one or more models are served from cache 106. However, when system 100 receives a request for model(s) 114 that are absent from cache 106, cache 106 provides, to data store 104, request 112 for model(s) 114. In response, model(s) 114 are identified from among models 108 maintained in data store 104 and provided to cache 106. Thus, reactive caching is used to avoid another cache miss for the same model(s) 114 by adding model(s) 114 to subset of models 110 maintained in cache 106.

In some embodiments, models may be served only from cache 106. For example, in real-time applications, such as online advertising, a relevant advertisement may be determined for a particular user concurrently with a page load. Accordingly, for faster performance, applications that request models may exclusively interact with the smaller set of data stored in cache 106. A non-limiting example of such applications includes an application that is part of a content delivery exchange, which is described in greater detail below.

In such embodiments, cache misses are especially undesirable, because they cause default values to be served instead of any version, current or superseded, of the requested data. For example, in response to a first request for model(s) 114, average values may be served from cache 106 in the event of a cache miss. However, model(s) 114 are stored in cache 106 to avoid further cache misses. Thus, in response to a second request, model(s) 114 may be served from cache 106.

Models 108 are also provided to filtering component 116 for further processing. Filtering component 116 may be one or more computing devices and/or software executed by the one or more computing devices that determine a subset of models 122 based on one or more criteria. In some embodiments, filtering component 116 and training component 102 may be the same one or more computing devices and/or the same one or more computing devices may include both filtering component 116 and training component 102. For example, filtering component 116 and training component 102 may be separate sets of instructions executed by the same one or more computing devices. In some embodiments, filtering component 116 may be one or more computing devices that are separate from the one or more computing devices of training component 102 and/or the one or more computing devices that include filtering component 116 may be separate from the one or more computing devices that include training component 102. For example, filtering component 116 may be implemented on another one or more clusters of computers using a framework for distributed storage and processing of big data sets, such as Apache Hadoop.

As will be described in greater detail below, subset of models 122 may be selected for predictive caching. Advantageously, predictive caching has the benefits of reducing cache miss rates and reducing the latency of causing updated versions of data to be stored in cache 106.

Subset of models 122 is transmitted from filtering component 116 to messaging service 118. Messaging service 118 may be one or more computing devices and/or software executed by the one or more computing devices that makes data available for consumption via message queues, data pipelines, and/or the like. For example, messaging service 118 may be one or more clusters of server computers using a distributed data stream processing platform for publishing streams of data to subscribers. An example of a distributed data stream processing platform is Apache Kafka. Thus, messaging service 118 may receive subset of models 122 via Kafka push jobs to generate Kafka events.

Subset of models 122 is received from messaging service 118 by listening component 120. Listening component 120 may be one or more computing devices and/or software executed by the one or more computing devices that retrieves data from messaging service 118. For example, listening component 120 may be one of a plurality of Kafka consumers that pull subset of models 122 from messaging service 118. In some embodiments, listening component 120, data store 104, and/or cache 106 may be the same one or more computing devices; and/or the same one or more computing devices may include listening component 120, data store 104, and/or cache 106. For example, listening component 120 may be one of a plurality of subscriber applications executing on (or associated with) a Voldemort distributed key-value store. In some embodiments, listening component 120 may be one or more computing devices that are separate from the one or more computing devices of data store 104 and/or cache 106; and/or the one or more computing devices that include listening component 120 may be separate from the one or more computing devices that include data store 104 and/or cache 106. For example, listening component 120 may be another one or more clusters of computers using the Apache Hadoop framework for distributed storage and processing of big data sets.

Listening component 120 further causes subset of models 122 to be stored in cache 106. Thus, filtering component 116, messaging service 118, and/or listening component 120 may work in concert to cause near real-time updating of cache 106 with subset of models 122. In some embodiments, subset of models 110 may include subset of models 122. In some embodiments, subset of models 110 may be separate from subset of models 122.

Selecting Models for Predictive Caching

As mentioned above, based on one or more criteria, filtering component 116 selects subset of models 122 for predictive caching. In general, the one or more criteria are used to determine which models of models 108 are most likely to be requested. Such models are included in subset of models 122 and stored in cache 106 prior to cache 106 receiving any requests for the models. This approach is particularly useful during a "cold start" of system 100, which involves populating an empty cache 106 based on predictive caching to minimize cache misses.

In some embodiments, the one or more criteria may be used to select models that are deemed "active". Active models may include models that have been requested recently, such as within the last twenty-four hours. Training component 102 may be notified of an event indicating that a model was requested, and this information may be conveyed to filtering component 116, for example, via metadata. Additionally or alternatively, active models may include models that have been served frequently. For example, filtering component 116 may determine subset of models 122 based on scanning metadata indicating a number of times that a particular model has been requested in a particular time period.

In some embodiments, the one or more criteria may be used to select models that correspond to new content items, which are likely to become active. For example, newly created advertisements are more likely to be requested than older advertisements, because advertisements typically exhibit decreasing effectiveness after a certain number of exposures. Thus, filtering component 116 may determine subset of models 122 based on scanning metadata indicating when a particular model was created.

However, in some embodiments, the number of models that are selected for inclusion in subset of models 122 may be limited by the size of cache 106. Any of a variety of cache eviction policies, such as a least recently used policy, may be used to alleviate this constraint. Nevertheless, one or more criteria for further selectivity may be used in such embodiments. For example, models may be ranked, and a predetermined number of the highest ranking models may be selected. Additionally or alternatively, comparison to a threshold value may be used to determine which of the highest ranking models are selected.

In some embodiments, the one or more criteria may be used to select models that have been updated based on user interaction data. As mentioned above, training component 102 may be notified of when a model is requested. Information indicating how a user interacted with a content item (e.g., click, play back, scroll) may be collected and used to update the model. Such user interaction data may comprise (1) impression data items, each of which indicates a content item that was presented to a user (and may identify the user) and (2) click data items, each of which indicates a content item that was selected (e.g., clicked) by a user (and may identify the user). Thus, training component 102 may generate an updated version of the model based on user interaction data.

However, training component 102 may generate a large number of updated versions of models. Accordingly, to conserve space in cache 106, filtering component 116 may select some of the updated versions to be stored in cache 106. Referring to FIG. 2, old version 200 has been updated to generate new version 202. To enable comparison of different versions, filtering component 116 may include storage for maintaining the different versions of a model.

Old version 200 and new version 202 are each represented as a set of coefficients that are used to predict a click-through rate for a particular content item. Filtering component 116 may compare the versions based on computing a difference value between old version 200 and new version 202. This may involve determining differences between the set of coefficients for old version 200 and the set of coefficients for new version 202. For example, filtering component 116 may determine a difference between the respective first coefficients of each of old version 200 and new version 202, the respective second coefficients of each of old version 200 and new version 202, the respective third coefficients of each of old version 200 and new version 202, and so forth. In other words, filtering component 116 may determine the difference between "0.8" and "0.2", the difference between "0.1" and "0.5", the difference between "1.4" and "1.2", and so forth. In some embodiments, filtering component 116 further determines an absolute value of each difference. The differences or absolute differences are added together to determine the difference value between old version 200 and new version 202.

Filtering component 116 may compare the difference value to a predetermined threshold value. For example, the predetermined threshold value may be "1.5", and the difference value may be "3.0". If filtering component 116 determines that the difference value exceeds the threshold value, new version 202 is included in subset of models 122. However, if the threshold value exceeds the difference value, then new version 202 is excluded from subset of models 122. Referring to FIG. 2, adding the absolute differences between old version 200 and new version 202 yields a difference value of "3.0", which exceeds the threshold value of "1.5". Accordingly, new version 202 is included in subset of models 122, which is stored in cache 106.

Content Distribution System

Figure 3:
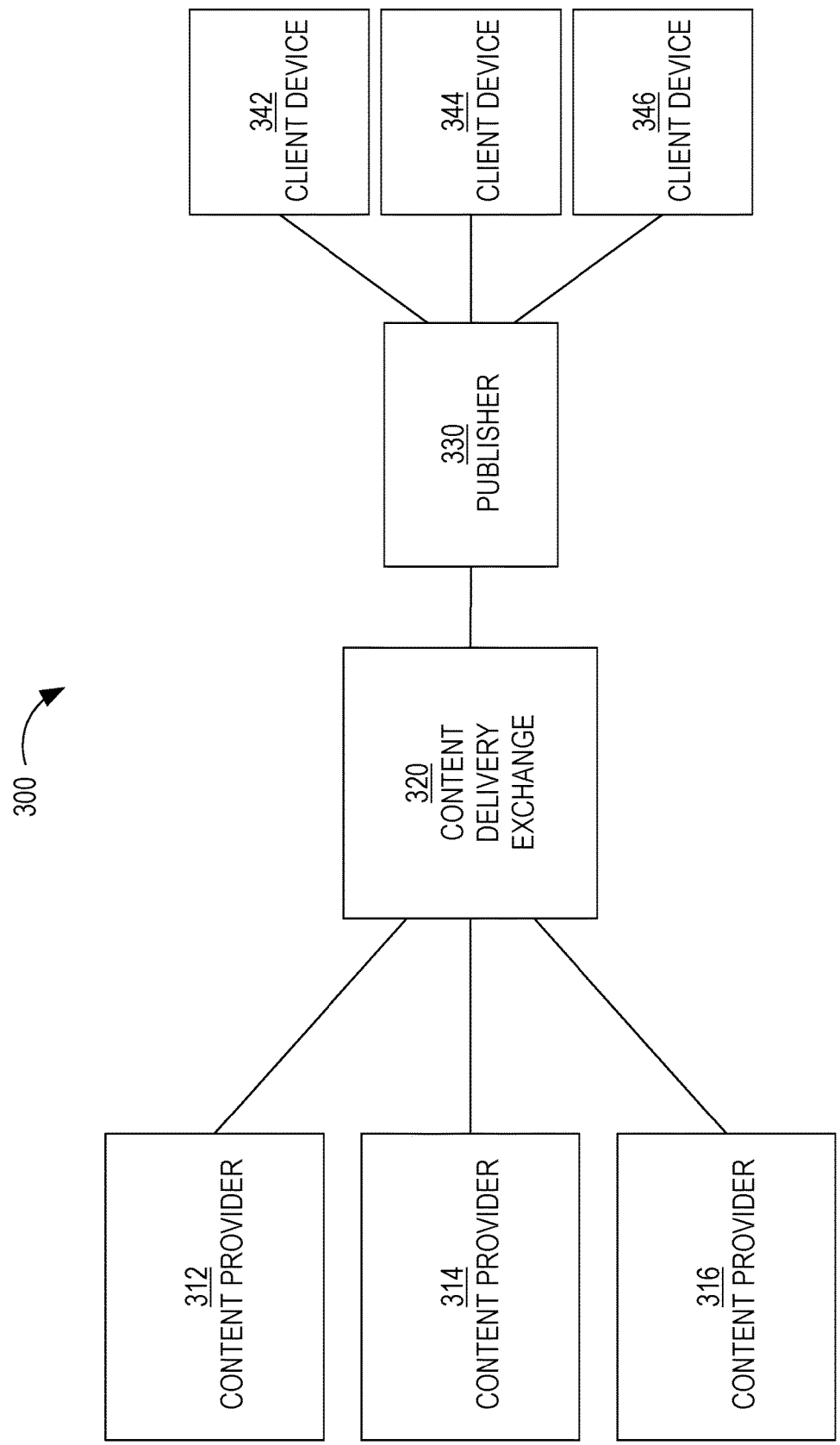
FIG. 3 depicts an example content distribution system.

FIG. 3 is a block diagram that depicts a system 300 for distributing content items to one or more end-users, in an embodiment. System 300 includes content providers 312-316, a content delivery exchange 320, a publisher 330, and client devices 342-346. Although three content providers are depicted, system 300 may include more or less content providers. Similarly, system 300 may include more than one publisher and more or less client devices.

Content providers 312-316 interact with content delivery exchange 320 (e.g., over a network, such as a LAN, WAN, or the Internet) to enable content items to be presented, though publisher 330, to end-users operating client devices 342-346. Thus, content providers 312-316 provide content items to content delivery exchange 320, which in turn selects content items to provide to publisher 330 for presentation to users of client devices 342-346. However, at the time that content provider 312 registers with content delivery exchange 320, neither party may know which end-users or client devices will receive content items from content provider 312, unless a target audience specified by content provider 312 is small enough.

An example of a content provider includes an advertiser. An advertiser of a product or service may be the same party as the party that makes or provides the product or service. Alternatively, an advertiser may contract with a producer or service provider to market or advertise a product or service provided by the producer/service provider. Another example of a content provider is an online ad network that contracts with multiple advertisers to provide content items (e.g., advertisements) to end users, either through publishers directly or indirectly through content delivery exchange 320.

Although depicted in a single element, content delivery exchange may comprise multiple computing elements and devices, connected in a local network or distributed regionally or globally across many networks, such as the Internet. Thus, content delivery exchange 320 may comprise multiple computing elements, including file servers and database systems.

Publisher 330 provides its own content to client devices 342-346 in response to requests initiated by users of client devices 342-346. The content may be about any topic, such as news, sports, finance, and traveling. Publishers may vary greatly in size and influence, such as Fortune 500 companies, social network providers, and individual bloggers. A content request from a client device may be in the form of a HTTP request that includes a Uniform Resource Locator (URL) and may be issued from a web browser or a software application that is configured to only communicate with publisher 330 (and/or its affiliates). A content request may be a request that is immediately preceded by user input (e.g., selecting a hyperlink on web page) or may initiated as part of a subscription, such as through a Rich Site Summary (RSS) feed. In response to a request for content from a client device, publisher 330 provides the requested content (e.g., a web page) to the client device.

Simultaneously or immediately before or after the requested content is sent to a client device, a content request is sent to content delivery exchange 320. That request is sent (over a network, such as a LAN, WAN, or the Internet) by publisher 330 or by the client device that requested the original content from publisher 330. For example, a web page that the client device renders includes one or more calls (or HTTP requests) to content delivery exchange 320 for one or more content items. In response, content delivery exchange 320 provides (over a network, such as a LAN, WAN, or the Internet) one or more particular content items to the client device directly or through publisher 330. In this way, the one or more particular content items may be presented (e.g., displayed) concurrently with the content requested by the client device from publisher 330.

In response to receiving a content request, content delivery exchange 320 initiates a content item selection event that involves selecting one or more content items (from among multiple content items) to present to the client device that initiated the content request. An example of a content item selection event is an auction.

Content delivery exchange 320 and publisher 330 may be owned and operated by the same entity or party. Alternatively, content delivery exchange 320 and publisher 330 are owned and operated by different entities or parties.

A content item may comprise an image, a video, audio, text, graphics, virtual reality, or any combination thereof. A content item may also include a link (or URL) such that, when a user selects (e.g., with a finger on a touchscreen or with a cursor of a mouse device) the content item, a (e.g., HTTP) request is sent over a network (e.g., the Internet) to a destination indicated by the link. In response, content of a web page corresponding to the link may be displayed on the user's client device.

Examples of client devices 342-346 include desktop computers, laptop computers, tablet computers, wearable devices, video game consoles, and smartphones.

Bidders

In a related embodiment, system 300 also includes one or more bidders (not depicted). A bidder is a party that is different than a content provider, that interacts with content delivery exchange 320, and that bids for space (on one or more publishers, such as publisher 330) to present content items on behalf of multiple content providers. Thus, a bidder is another source of content items that content delivery exchange 320 may select for presentation through publisher 330. Thus, a bidder acts as a content provider to content delivery exchange 320 or publisher 330. Examples of bidders include AppNexus, DoubleClick, and LinkedIn. Because bidders act on behalf of content providers (e.g., advertisers), bidders create content delivery campaigns and, thus, specify user targeting criteria and, optionally, frequency cap rules, similar to a traditional content provider.

In a related embodiment, system 300 includes one or more bidders but no content providers. However, embodiments described herein are applicable to any of the above-described system arrangements.

Content Delivery Campaigns

Each content provider establishes a content delivery campaign with content delivery exchange 320. A content delivery campaign includes (or is associated with) one or more content items. Thus, the same content item may be presented to users of client devices 342-346. Alternatively, a content delivery campaign may be designed such that the same user is (or different users are) presented different content items from the same campaign. For example, the content items of a content delivery campaign may have a specific order, such that one content item is not presented to a user before another content item is presented to that user.

A content delivery campaign has a start date/time and, optionally, a defined end date/time. For example, a content delivery campaign may be to present a set of content items from Jun. 1, 2015 to Aug. 1, 2015, regardless of the number of times the set of content items are presented ("impressions"), the number of user selections of the content items (e.g., click throughs), or the number of conversions that resulted from the content delivery campaign. Thus, in this example, there is a definite (or "hard") end date. As another example, a content delivery campaign may have a "soft" end date, where the content delivery campaign ends when the corresponding set of content items are displayed a certain number of times, when a certain number of users view the set of content items, select or click on the set of content items, or when a certain number of users purchase a product/service associated with the content delivery campaign or fill out a particular form on a website.

A content delivery campaign may specify one or more targeting criteria that are used to determine whether to present a content item of the content delivery campaign to one or more users. Example factors include date of presentation, time of day of presentation, characteristics of a user to which the content item will be presented, attributes of a computing device that will present the content item, identity of the publisher, etc. Examples of characteristics of a user include demographic information, residence information, job title, employment status, academic degrees earned, academic institutions attended, former employers, current employer, number of connections in a social network, number and type of skills, number of endorsements, and stated interests. Examples of attributes of a computing device include type of device (e.g., smartphone, tablet, desktop, laptop), current geographical location, operating system type and version, size of screen, etc.

For example, targeting criteria of a particular content delivery campaign may indicate that a content item is to be presented to users with at least one undergraduate degree, who are unemployed, who are accessing from South America, and where the request for content items is initiated by a smartphone of the user. If content delivery exchange 320 receives, from a computing device, a request that does not satisfy the targeting criteria, then content delivery exchange 320 ensures that any content items associated with the particular content delivery campaign are not sent to the computing device.

Thus, content delivery exchange 320 is responsible for selecting a content delivery campaign in response to a request from a remote computing device by comparing (1) targeting data associated with the computing device and/or a user of the computing device with (2) targeting criteria of one or more content delivery campaigns. Multiple content delivery campaigns may be identified in response to the request as being relevant to the user of the computing device. Content delivery campaign 320 may select a strict subset of the identified content delivery campaigns from which content items will be identified and presented to the user of the computing device.

Instead of one set of targeting criteria, a single content delivery campaign may be associated with multiple sets of targeting criteria. For example, one set of targeting criteria may be used during one period of time of the content delivery campaign and another set of targeting criteria may be used during another period of time of the campaign. As another example, a content delivery campaign may be associated with multiple content items, one of which may be associated with one set of targeting criteria and another one of which is associated with a different set of targeting criteria. Thus, while one content request from publisher 330 may not satisfy targeting criteria of one content item of a campaign, the same content request may satisfy targeting criteria of another content item of the campaign.

Different content delivery campaigns that content delivery exchange 320 manages may have different charge models. For example, content delivery exchange 320 may charge a content provider of one content delivery campaign for each presentation of a content item from the content delivery campaign (referred to herein as cost per impression or CPM). Content delivery exchange 320 may charge a content provider of another content delivery campaign for each time a user interacts with a content item from the content delivery campaign, such as selecting or clicking on the content item (referred to herein as cost per click or CPC). Content delivery exchange 320 may charge a content provider of another content delivery campaign for each time a user performs a particular action, such as purchasing a product or service, downloading a software application, or filling out a form (referred to herein as cost per action or CPA). Content delivery exchange 320 may manage only campaigns that are of the same type of charging model or may manage campaigns that are of any combination of the three types of charging models.

A content delivery campaign may be associated with a resource budget that indicates how much the corresponding content provider is willing to be charged by content delivery exchange 320, such as $100 or $5,200. A content delivery campaign may also be associated with a bid amount that indicates how much the corresponding content provider is willing to be charged for each impression, click, or other action. For example, a CPM campaign may bid five cents for an impression, a CPC campaign may bid five dollars for a click, and a CPA campaign may bid five hundred dollars for a conversion (e.g., a purchase of a product or service).

Content Item Selection Events

As mentioned previously, a content item selection event is when multiple content items are considered and a subset selected for presentation on a computing device in response to a request. Thus, each content request that content delivery exchange 320 receives triggers a content item selection event.

For example, in response to receiving a content request, content delivery exchange 320 analyzes multiple content delivery campaigns to determine whether attributes associated with the content request (e.g., attributes of a user that initiated the content request, attributes of a computing device operated by the user, current date/time) satisfy targeting criteria associated with each of the analyzed content delivery campaigns. If so, the content delivery campaign is considered a candidate content delivery campaign. One or more filtering criteria may be applied to a set of candidate content delivery campaigns to reduce the total number of candidates.

As another example, users are assigned to content delivery campaigns (or specific content items within campaigns) "off-line"; that is, before content delivery exchange 320 receives a content request that is initiated by the user. For example, when a content delivery campaign is created based on input from a content provider, one or more computing components may compare the targeting criteria of the content delivery campaign with attributes of many users to determine which users are to be targeted by the content delivery campaign. If a user's attributes satisfy the targeting criteria of the content delivery campaign, then the user is assigned to a target audience of the content delivery campaign. Thus, an association between the user and the content delivery campaign is made. Later, when a content request that is initiated by the user is received, all the content delivery campaigns that are associated with the user may be quickly identified, in order to avoid real-time (or on-the-fly) processing of the targeting criteria. Some of the identified campaigns may be further filtered based on, for example, the campaign being deactivated or terminated, the device that the user is operating being of a different type (e.g., desktop) than the type of device targeted by the campaign (e.g., mobile device).

A final set of candidate content delivery campaigns is ranked based on one or more criteria, such as predicted click-through rate (which may be relevant only for CPC campaigns), effective cost per impression (which may be relevant to CPC, CPM, and CPA campaigns), and/or bid price. Each content delivery campaign may be associated with a bid price that represents how much the corresponding content provider is willing to pay (e.g., content delivery exchange 320) for having a content item of the campaign presented to an end-user or selected by an end-user. Different content delivery campaigns may have different bid prices. Generally, content delivery campaigns associated with relatively higher bid prices will be selected for displaying their respective content items relative to content items of content delivery campaigns associated with relatively lower bid prices. Other factors may limit the effect of bid prices, such as objective measures of quality of the content items (e.g., actual click-through rate (CTR) and/or predicted CTR of each content item), budget pacing (which controls how fast a campaign's budget is used and, thus, may limit a content item from being displayed at certain times), frequency capping (which limits how often a content item is presented to the same person), and a domain of a URL that a content item might include.

An example of a content item selection event is an advertisement auction, or simply an "ad auction."

In one embodiment, content delivery exchange 320 conducts one or more content item selection events. Thus, content delivery exchange 320 has access to all data associated with making a decision of which content item(s) to select, including bid price of each campaign in the final set of content delivery campaigns, an identity of an end-user to which the selected content item(s) will be presented, an indication of whether a content item from each campaign was presented to the end-user, a predicted CTR of each campaign, a CPC or CPM of each campaign.

In another embodiment, an exchange that is owned and operated by an entity that is different than the entity that owns and operates content delivery exchange 320 conducts one or more content item selection events. In this latter embodiment, content delivery exchange 320 sends one or more content items to the other exchange, which selects one or more content items from among multiple content items that the other exchange receives from multiple sources. In this embodiment, content delivery exchange 320 does not know (a) which content item was selected if the selected content item was from a different source than content delivery exchange 320 or (b) the bid prices of each content item that was part of the content item selection event. Thus, the other exchange may provide, to content delivery exchange 320 (or to a performance simulator described in more detail herein), information regarding one or more bid prices and, optionally, other information associated with the content item(s) that was/were selected during a content item selection event, information such as the minimum winning bid or the highest bid of the content item that was not selected during the content item selection event.

Tracking User Interactions

Content delivery exchange 320 tracks one or more types of user interactions across client devices 342-346 (and other client devices not depicted). For example, content delivery exchange 320 determines whether a content item that content delivery exchange 320 delivers is presented at (e.g., displayed by or played back at) a client device. Such a "user interaction" is referred to as an "impression." As another example, content delivery exchange 320 determines whether a content item that exchange 320 delivers is selected by a user of a client device. Such a "user interaction" is referred to as a "click." Content delivery exchange 320 stores such data as user interaction data, such as an impression data set and/or a click data set.

For example, content delivery exchange 320 receives impression data items, each of which is associated with a different instance of an impression and a particular content delivery campaign. An impression data item may indicate a particular content delivery campaign, a specific content item, a date of the impression, a time of the impression, a particular publisher or source (e.g., onsite v. offsite), a particular client device that displayed the specific content item, and/or a user identifier of a user that operates the particular client device. Thus, if content delivery exchange 320 manages multiple content delivery campaigns, then different impression data items may be associated with different content delivery campaigns. One or more of these individual data items may be encrypted to protect privacy of the end-user.

Similarly, a click data item may indicate a particular content delivery campaign, a specific content item, a date of the user selection, a time of the user selection, a particular publisher or source (e.g., onsite v. offsite), a particular client device that displayed the specific content item, and/or a user identifier of a user that operates the particular client device.

Process Overview

Figure 4:
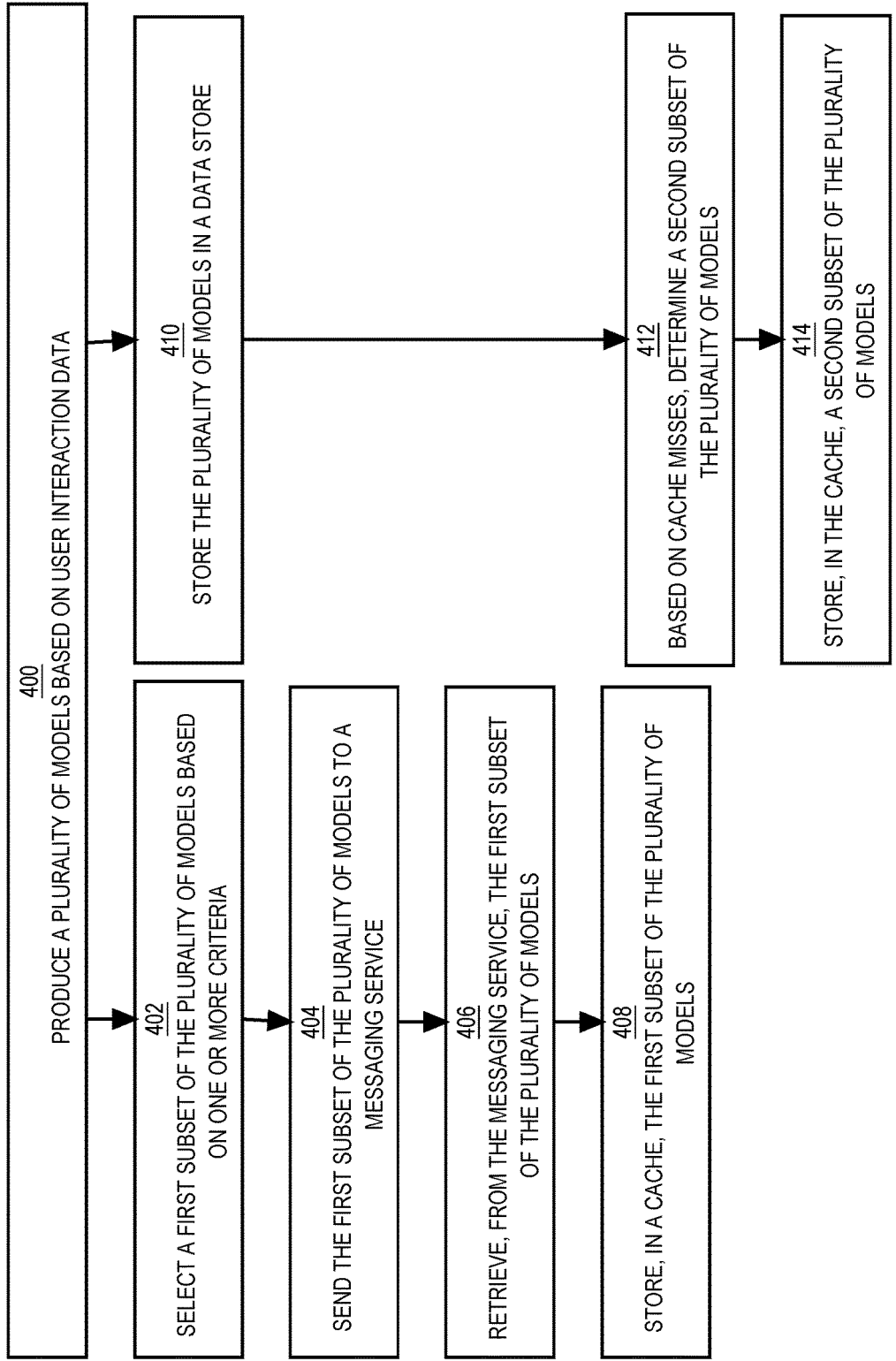
FIG. 4 is a flow diagram that depicts an approach for cache management in the context of multi-node databases.

FIG. 4 is a flow diagram that depicts an approach for cold starting cache 106. More specifically, when cache 106 is empty, cache 106 is populated with models selected by filtering component 116 prior to retrieving, into cache 106, any models from data store 104. In other words, cache 106 is populated using predictive caching before reactive caching is used to store data in response to a cache miss.

At block 400, a cluster of training computers may produce a plurality of models based on user interaction data. Each model may be used to predict a click-through rate of an online advertisement to be loaded concurrently with a particular webpage. Block 400 may proceed to block 402 and/or block 410.

At block 402, a cluster of filtering computers may select a first subset of the plurality of models based on one or more criteria. The one or more criteria may include a time period during which a particular model was created, a number of times that a particular model was served during a particular time period, a degree of difference between old and new versions of a particular model, and/or the like. In some embodiments, the cluster of training computers may also be the cluster of filtering computers.

At block 404, the cluster of filtering computers may send the first subset of the plurality of models to a messaging service provided by a cluster of messaging servers. For example, each model in the first subset may be published based on pushing the model into a message queue, from which the model is available for pulling by a subscriber.

At block 406, a plurality of listening computers may retrieve, from the messaging service, the first subset of the plurality of models. For example, each instance of a listening computer may pull a different model from a message queue.

At block 408, the plurality of listening computers may cause the first subset of the plurality of models to be stored in a cache. In some embodiments, the plurality of listening computers may also be a cluster of computers that host a distributed cache.

Thus, predictive caching may be used to pre-fetch models into the cache. In some embodiments, block 408 may proceed to block 400 for another iteration.

At block 410, a distributed data store may store the plurality of models. Block 410 may be performed at any time relative to blocks 402-408. For example, block 410 may be performed prior to, concurrently with, or subsequent to block 402.

At block 412, the distributed data store may determine a second subset of the plurality of models based on cache misses. For example, when a cache experiences cache misses, the cache may send the data store requests for particular models. In some embodiments, the distributed data store may also host the cache.

At block 414, the cache may store the second subset of the plurality of models in response to the cache experiencing one or more cache misses. Thus, reactive caching may be used to store particular models in the cache in anticipation for subsequent requests for the particular models. Accordingly, at block 414, the cache may store both the first and second subsets of the plurality of models. In some embodiments, the cache may have a size that is unable to accommodate both the first and second subsets of the plurality of models. In such embodiments, some of the cache memory may be freed based on a cache eviction policy. In some embodiments, block 414 may proceed to block 412 for another iteration.

FIG. 4 depicts an initial iteration in which block 408 is performed prior to blocks 412-414 in order to pre-populate the cache with models, thereby reducing cache misses that cause performance of blocks 412-414. However, in subsequent iterations, block 408 may be performed at any time relative to blocks 412-414.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
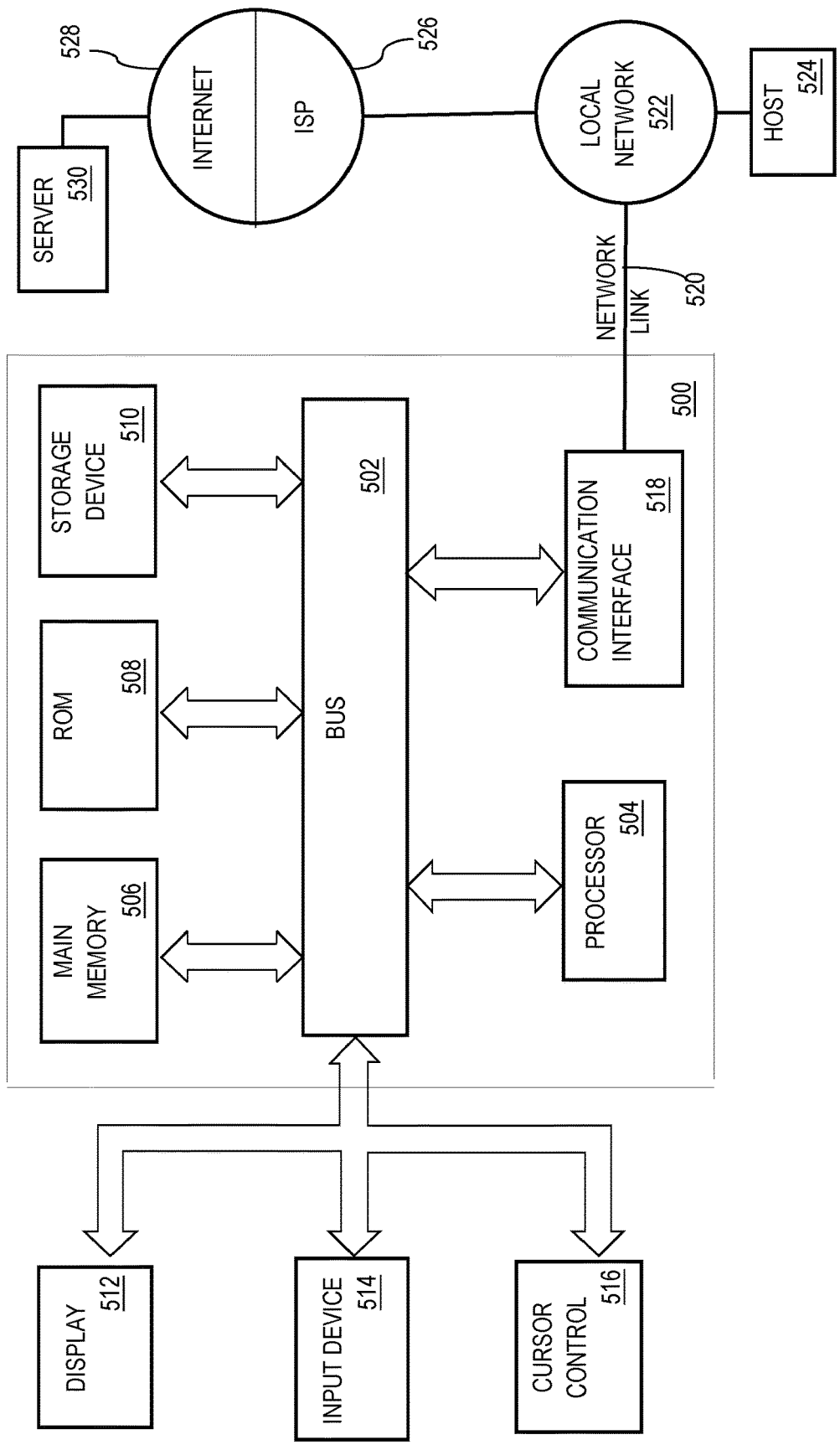
FIG. 5 depicts a computer system upon which an embodiment may be implemented.

For example, FIG. 5 is a block diagram that illustrates a computer system 500 upon which an embodiment of the disclosure may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the disclosure have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A system comprising:
   a training component that produces a plurality of models based on user interaction data;
   a cache that stores a first subset of the plurality of models
   a filtering component that:
      computes a difference value representing one or more value changes between one or more values in an old version of a model in the first subset and one or more values in a new version of the model,
      determines whether the difference value exceeds a threshold value,
      selects a second subset of the plurality of models that includes the new version of the model if the difference value exceeds the threshold value, and
      sends the second subset of the plurality of models to a messaging service;
   a listening component that retrieves, from the messaging service, the second subset of the plurality of models and causes the second subset of the plurality of models to be stored in the cache.

2. The system of claim 1, wherein selection of the second subset is based on one or more criteria that are used to determine which models of the plurality of models are most likely to be requested.

3. The system of claim 1, wherein the second subset of the plurality of models comprise models to be stored in the cache prior to the cache receiving any requests for the models.

4. The system of claim 1, wherein the old version and new version are each represented as a set of coefficients that are used to predict a click-through rate for a content item.

5. The system of claim 4, wherein the filtering component, in computing the difference value for the model:
   determines a set of absolute differences between the set of coefficients for the old version and the set of coefficients for the new version;
   adds the set of absolute differences to compute the difference value between the old version and the new version.

6. The system of claim 1, wherein a number of the second subset of the plurality of models is based on a size of the cache.

7. The system of claim 1, wherein when the cache is empty, the cache is populated with models selected by the filtering component prior to retrieving, into the cache, any models from a data store.

8. The system of claim 1, wherein selection of the second subset is based on one or more criteria that comprise a number of times that a particular model has been requested in a particular time period.

9. The system of claim 1, wherein selection of the second subset is based on one or more criteria that comprise whether a particular model corresponds to a new content item.

10. A method comprising:
    producing a plurality of models based on user interaction data;
    causing a first subset of the plurality of models to be stored in a cache;
    computing a difference value representing one or more value changes between one or more values in an old version of a model in the first subset and one or more values in a new version of the model;
    determining whether the difference value exceeds a threshold value;
    selecting a second subset of the plurality of models that includes the new version of the model if the difference value exceeds the threshold value;
    sending the second subset of the plurality of models to a messaging service;
    retrieving, from the messaging service, the second subset of the plurality of models;
    causing the second subset of the plurality of models to be stored in the cache;
    wherein the method is performed by one or more computing devices.

11. The method of claim 10, wherein selecting the second subset of the plurality of models further comprises using one or more criteria to determine which models of the plurality of models are most likely to be requested.

12. The method of claim 10, wherein the second subset of the plurality of models comprise models to be stored in the cache prior to the cache receiving any request for the models.

13. The method of claim 10, wherein the old version and the new version are each represented as a set of coefficients that are used to predict a click-through rate for a content item.

14. The method of claim 13, wherein computing the difference value for the model comprises:
    determining a set of absolute differences between the set of coefficients for the old version and the set of coefficients for the new version;
    adding the set of absolute differences to compute the difference value between the old version and the new version.

15. The method of claim 10, wherein a number of the second subset of the plurality of models is based on a size of the cache.

16. The method of claim 10, wherein when the cache is empty, the cache is populated with models selected based on one or more criteria prior to retrieving, into the cache, any models from a data store.

17. The method of claim 10, wherein selecting the second subset of the plurality of models further comprises using one or more criteria comprising a number of times that a particular model has been requested in a particular time period.

18. The method of claim 10, wherein selecting the second subset of the plurality of models further comprises using one or more criteria comprising whether a particular model corresponds to a new content item.

\* \* \* \* \*